United States Patent

[11] 3,576,482

[72] Inventor Dong Woo Rhee
 Williamsville, N.Y.
[21] Appl. No. 853,301
[22] Filed Aug. 27, 1969
[45] Patented Apr. 27, 1971
[73] Assignee Sylvania Electric Products, Inc.

[54] RELAY CONTROL SYSTEM FOR PLURALITY OF BIDIRECTIONAL MOTORS
 12 Claims, 3 Drawing Figs.
[52] U.S. Cl. .................................... 318/16, 318/103
[51] Int. Cl. ..................................... H04q 7/02, H02p 1/58
[50] Field of Search .......................... 318/65, 16, 221, 54, 103

[56] References Cited
 UNITED STATES PATENTS
 2,782,351 2/1957 Suhr ........................... 318/221X
 3,045,159 7/1962 Levy et al. ................... 318/221X Primary Examiner—Benjamin Dobeck
Attorneys—Norman J. O'Malley, Donald R. Castle, Thomas H. Buffton and Edward J. Coleman ABSTRACT: A control system for a plurality of bidirectional motors comprising a like plurality of SPST relays respectively connected between the common junctions of the motor windings and a source of AC voltage. The windings of each of the motors are also connected in parallel across a phase-shifting capacitor and across the contact terminals of a SPDT relay, the common terminal of which is connected to the AC voltage source. Rotation of a selected motor in one direction is provided by energizing the SPST relay connected to the common junction of the windings of that motor. Rotation of that motor in the opposite direction is effected by energizing both the SPST relay connected to its common winding junction and the SPDT relay.

INVENTOR
DONG W. RHEE

BY Donald R. Castle
ATTORNEY

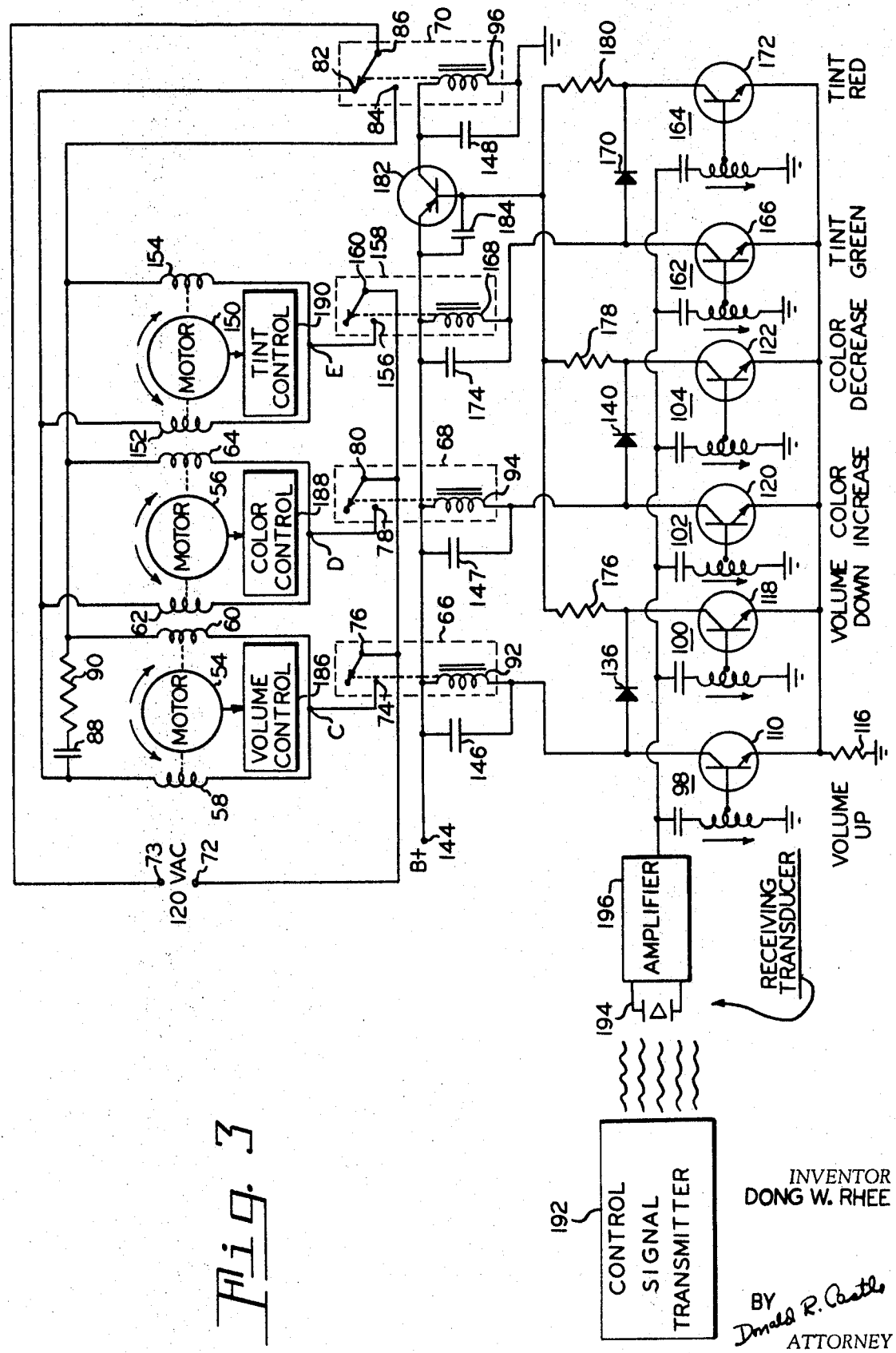

RELAY CONTROL SYSTEM FOR PLURALITY OF BIDIRECTIONAL MOTORS

BACKGROUND OF THE INVENTION

This invention relates generally to motor control systems and, more particularly, to an improved relay control system for applications employing a plurality of bidirectional motors, such as television remote control systems.

A typical prior art relay control system for bidirectional motors is illustrated in FIG. 1. Two phase shift synchronous motors 10 and 12 are shown connected across a source of alternating current (AC) line voltage, represented by terminals 14 and 16, via a set of four single-pole single-throw (SPST) relays 18, 20, 22 and 24. Each of the motors 10 and 12 rotates clockwise or counterclockwise, depending upon the manner in which AC voltage is applied to its respective pair of motor windings. As illustrated, windings 26 and 28 control motor 10, and windings 30 and 32 control motor 12. The common junction A of windings 26 and 28 is connected directly to one side of the AC voltage source, represented by terminal 14, and a phase-shifting capacitor 34 and resistor 36 are serially connected across the other terminals of windings 26 and 28, which are respectively coupled via relays 18 and 20 to the other side of the AC voltage source, represented by terminal 16. In like manner, common junction B of windings 30 and 32 is connected to AC voltage terminal 14, and a capacitor 38 and resistor 40 are serially connected across the other terminals of windings 30 and 32, which are respectively coupled via relays 22 and 24 to AC voltage terminal 16.

Upon closure of one of the relays, capacitor 34 or capacitor 38 is connected in series with the motor winding not directly connected via a relay to terminal 16; the capacitor thereby forms and LC network with that winding to provide a phase shifted AC current therethrough. Resistors 36 and 40 are selected to reduce any arcing across the relay contacts resulting from the inductive "kick" of the motor windings.

Referring to relay 18 and assuming relays 20, 22 and 24 are open, energization of relay coil 42 causes closure of contacts 44 and 46 to thereby permit a main AC current flow through motor winding 26 and a phase shifted AC current flow through capacitor 34 and winding 28. As a result of energizing windings 26 and 28 in this manner, motor 10 is caused to rotate in a counterclockwise direction. The phase shifted current in winding 28, as previously noted, is due to the LC network formed by capacitor 34 and winding 28.

To rotate motor 10 clockwise, relay 20 should be closed, with relays 18, 22 and 24 being open. More specifically, relay coil 48 is energized to close contacts 50 and 52 and thus allow a main AC current flow through motor winding 28 and a phase shifted AC current flow through capacitor 34 and winding 26.

Operation of motor 12 is identical to that of motor 10, with relays 22 and 24 functioning analogous to relays 18 and 20.

Although having a wide variety of uses, a particularly suitable and typical application of the set of relay controlled bidirectional motors shown in FIG. 1 is for providing two-way rotation of potentiometers, or the like, in a television remote control system. In such a case, each of the relay coils is respectively energized by a corresponding resonant circuit responsive to a unique tone transmitted from a remote control signal source. A color television remote control system typically would employ three or four bidirectional motors; e.g. for color, tint, volume and UHF tuning. As a consequence, six or eight relays would be required, as the prior art system of FIG. 1 requires two relays per motor. In addition, a phase shifting capacitor is required for each set of motor windings. Since relays are relatively high cost items and consume a considerable amount of space, and the phase shift capacitors are also relatively costly, significant advantages are to be obtained by reducing the number of relays and capacitors required to achieve the control functions described with respect to FIG. 1.

SUMMARY OF THE INVENTION

Accordingly, it is an object of the present invention to provide an improved motor control system.

It is another object of the invention to provide a control system for a plurality of bidirectional motors which employs a substantially reduced number of relays and associated components as compared to prior art systems performing the same function.

It is a further object of the invention to provide a more economical, compact and reliable remote control system for a television receiver.

Briefly, these objects are attained by a control system for a plurality of motors each having first and second windings, the control system comprising a like plurality of first switching means respectively coupled between the common junctions of the first and second windings of said motors and one terminal of a source of AC voltage. A second switching means has a first terminal connected to each of the first motor windings, a second terminal connected to each of the second motor windings, and a common terminal connected to the other terminal of the AC voltage source.

BRIEF DESCRIPTION OF THE DRAWINGS

This invention will be more fully described hereinafter in conjunction with the accompanying drawings, in which:

FIG. 3 is a schematic diagram of an alternative embodiment of a relay control system for three bidirectional motors in accordance with the invention.

DESCRIPTION OF PREFERRED EMBODIMENT

For a better understanding of the present invention, together with other and further objects, advantages and capabilities thereof, reference is made to the following disclosure and appended claims in connection with the above-described drawings.

The present invention provides a control system for two or more bidirectional motors which employs a significantly fewer number of relays and associated components than heretofore required. More specifically, whereas prior art control systems, as exemplified by FIG. 1, required 2n electromechanical relays as the switching means for controlling n motors, the control system according to the invention requires only n+1 relays for providing the same control of n motors. Further, the present system employs one phase shifting capacitor and one antiarcing resistor for the entire string of motors to be controlled, as opposed to the prior art requirement of a capacitor and resistor for each set of motor windings. As relays are one of the more costly and bulky components in such a control system, a reduction in the number required provides significant advantages in economy and compactness. In addition, increased reliability is obtained by the use of fewer of the more unreliable components in the system.

Figure 2:
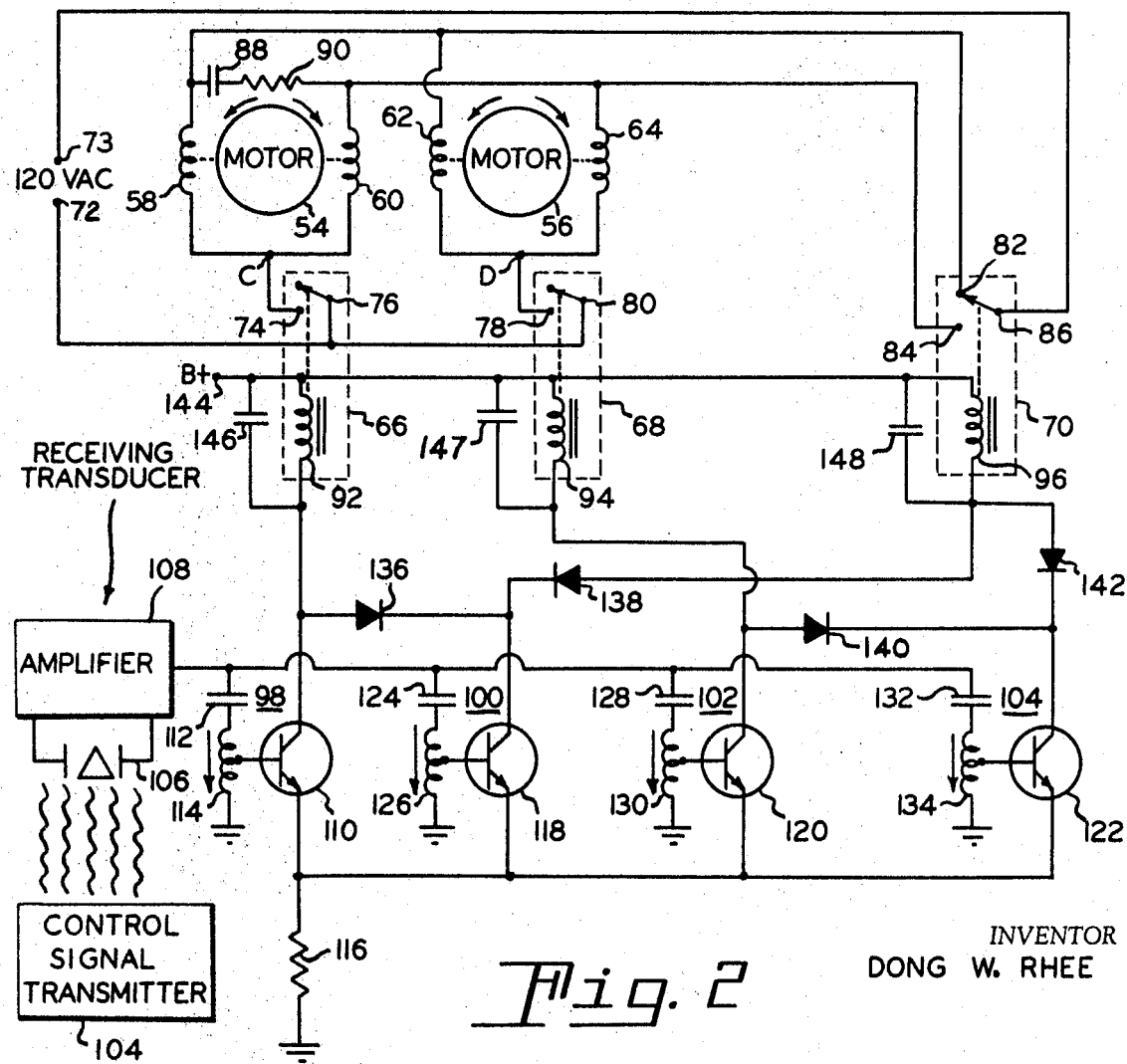
FIG. 2 is a schematic diagram of one embodiment of a relay control system for two bidirectional motors in accordance with the invention.

FIG. 2 illustrates one embodiment of a control system according to the invention as employed in a remote control system for regulating the direction of rotation of a pair of bidirectional motors 54 and 56. Each motor has a pair of windings for effecting motor rotation in response to a selected mode of alternating current (AC) energization. More specifically, motor 54 is controlled by windings 58 and 60, and motor 56 is actuated by windings 62 and 64. Selective energization of the motor windings from a source of AC line voltage, represented by terminals 72 and 73, is controlled by a system including a pair of single-pole single-throw (SPST) relay switching means 66 and 68, respectively associated with motors 54 and 56, and a single-pole double-throw (SPDT) relay switching means 70 coupled to all of the motor windings.

Motor windings 58 and 60 have a common junction C which is coupled through the normally open relay 66 to one side of the AC voltage source, represented by terminal 72 and illustrated as a typical 120 VAC line voltage source. In like manner, the common junction D of windings 62 and 64 is coupled through the normally open relay 68 to AC voltage terminal 72. More specifically, the SPST contacts of relay 66 include a normally open terminal 74 connected to common junction C and a common terminal 76 connected to AC terminal 72, and the contacts of relay 68 include a normally open terminal 78 connected to common junction D and a common terminal 80 connected to AC terminal 72.

The SPDT contacts of relay 70 include a normally closed terminal 82 connected to windings 58 and 62 at the ends opposite the common junctions, a normally open terminal 84 connected to windings 60 and 64 at the ends opposite the common junctions, and a common terminal 86 connected to the other side of the AC voltage source, represented by terminal 73. In addition, a capacitor 88 and resistor 90 are serially connected between the SPDT relay terminals 82 and 84 to provide phase shifting and antiarcing functions with respect to the entire motor control system. Of course, to be connected across relay terminals 82 and 84, capacitor 88 and resistor 90 may be connected across any of the sets of motor windings; e.g. in FIG. 2 these components are shown connected between the ends of windings 58 and 60 opposite the common junction C. In this manner, each set of motor windings is connected in parallel across the phase-shifting capacitor and across the SPDT relay terminals. Hence, as will be clarified hereinafter, closure of one of the SPST relays 66 or 68 will cause capacitor 88 to be connected in series with one of the motor windings whereby the capacitor cooperates with that winding to form an LC phase shifting network for the associated motor. That is, the single capacitor 88 is operative to provide a phase shifting function for each of the motors. Similarly, the single resistor 90 is operative to reduce arcing across the relay contacts resulting from the inductive "kick" of any of the motor windings.

The switch contacts of relays 66, 68 and 70 are actuated by respective relay coils 92, 94 and 96, which in turn are energized by control means comprising two pairs of signal detectors, each pair being associated with a respective one of the motors. Each of the signal detectors comprises a drive transistor and a series resonant LC circuit responsive to a selected control signal frequency. As illustrated, signal detectors 98 and 100 control motor 54, detectors 102 and 104 control motor 56, and the control signals are obtained by means of a remote control transmitter and receiver combination. More specifically, there is shown a control signal transmitter 104 for selectively generating any one of a plurality of control signals of different predetermined frequencies and radiating the selected frequencies as ultrasonic signals. In this instance, as there are four signal detectors, the control signal source will transmit any one of four different frequencies. Such ultrasonic tone transmitters are well known in the art and typically comprise an oscillator, a pushbutton switching arrangement for changing the oscillator frequencies, a transducer to radiate the signal and a battery or other source of power. The receiving means comprises a transducer 106, such as a capacitor-type microphone, for converting the received ultrasonic signals to electrical signals, and an amplifier 108 for amplifying the electrical signals from transducer 106 and providing an output to the resonant circuits of the signal detectors.

Signal detector 98 comprises a drive transistor 110 and a series resonant circuit, consisting of capacitor 112 and tunable coil 114, connected between the output of amplifier 108 and a source of reference potential, illustrated as ground. Resonant circuit 112—114 is coupled to the base electrode of transistor 110 by means of a tap on coil 114; the emitter of transistor 110 is connected to the ground via resistor 116; and the collector electrode of transistor 110, which represents the output of signal detector 98, is connected directly to one end of relay coil 92.

In like manner, detectors 100, 102 and 104 respectively comprise drive transistors 118, 120 and 122 and the series resonant capacitor-coil combinations 124—126, 128—130, and 132—134. Except for the collector outputs, the circuit connections of these detectors are identical to detector 98, with the emitters all being coupled to ground through the common resistor 116. The collector of transistor 118, which is the output of detector 100, is coupled through a diode 136 to the coil 92 of SPST relay 66 and through a diode 138 to the coil 96 of SPDT relay 70. More specifically, the anode of diode 136 is connected to the junction of one end of relay coil 92 and the collector of transistor 110 and the diode cathode is connected to the collector of transistor 118, while diode 138 is oriented with its anode connected to one end of relay coil 96 and its cathode connected to the collector of transistor 118. The output coupling means of signal detectors 102 and 104 is similar to that for the set of detectors 98 and 100. In particular, the collector of transistor 120 is connected directly to one end of relay coil 94, while the collector of transistor 122 is coupled through a diode 140 to SPST relay coil 94 and through a diode 142 to the end of the SPDT relay coil 96 to which diode 138 is connected. The collector supply voltage for the driver transistors is provided by a source of direct current (DC) voltage, denoted by B+ terminal 144, which is connected to each of the relay coils at the end opposite that coupled to the signal detector outputs. Consequently, the B+ supply voltage is provided through coils 92 and 94 to the collectors of transistors 110 and 120, through coils 92 and 96 and diodes 136 and 138 to the collector of transistor 118, and through coils 94 and 96 and diodes 140 and 142 to the collector of transistor 122.

Each of the four series resonant circuits 112—114, 124—126, 128—130 and 132—134 is tuned to resonate at a different one of the control signal frequencies adapted to be received by the system. Preferably, each resonant circuit is highly selective and will respond only to the frequency to which it is tuned while rejecting all other frequencies. Of course, the control frequencies should be appropriately spaced to avoid false or ambiguous triggering.

When not being activated by an input signal, each of the series resonant circuits provides no control signal, and the corresponding drive transistor is biased to cutoff by virtue of the selected base electrode tap point on the tuned coil. Upon receiving one of the predetermined control signal frequencies, the series resonant circuit tuned to respond to that frequency will be activated to couple the control signal to the base of the corresponding drive transistor. With a control signal applied to its base electrode, the drive transistor is rendered conducting during the positive half-cycle of the signal and turned off during the negative half-cycle. When conducting, the transistor completes the circuit path of its associated relay coil to ground through resistor 116, thereby permitting current to flow through the relay coil from the B+ supply at terminal 144. To maintain energization of associated relays during application of a control signal, capacitors 146, 147 and 148 are respectively connected across relay coils 92, 94 and 96. Thus, for example, when transistor 110 is conducting during the positive half-cycle of the control signal, capacitor 146 charges through the transistor. However, when transistor 110 is out off by the negative half-cycle of the control signal, current continues to flow through relay coil 92 as capacitor 146 discharges toward the B+ supply voltage. With relay coil 92 energized in this manner, the relay contacts 76 and 74 will be held closed as long as a control signal is applied to detector 98. The other signal detectors, of course, operate in similar fashion with respect to actuation of their associated relays.

To effect operation of the remote control system of FIG. 2, the operator depresses a button on transmitter 104 corresponding to the control function desired. That is, the transmitter may contain four selector buttons each operative to cause transmission of a respective one of four different ultrasonic control signal frequencies. For example, a first control signal frequency may correspond to counterclockwise rotation of motor 54; a second frequency may signal clockwise rotation of motor 54; and third and fourth signal frequencies may produce counterclockwise and clockwise rotation, respectively, of motor 56. If the button actuator functions to switch the frequency of an oscillator in the transmitter, and a capacitor-type microphone transducer is used to produce the radiated ultrasonic signal, the transducer conversion process will produce a sound signal that is double the frequency of the oscillator signal. On the other hand, the transmitter may comprise a plurality of tuned ultrasonic rods, with the selector buttons actuating individual striking of the rods to directly produce the radiated ultrasonic signal frequency.

In any event, the ultrasonic signal of the selected frequency is propagated through the air and received by the transducer 106, which converts the ultrasonic signal into an electrical signal of the same frequency. After passing through amplifier 108, the signal is applied to the four detector circuits 98, 100, 102 and 104.

If the received control signal is of a first predetermined frequency, only the resonant circuit 112—114 of detector 98 will be activated to cause positive half-cycle conduction of transistor 110. The periodic conduction of transistor 110, together with the action of capacitor 146, is operative to sustain energization of relay coil 92 for the duration of the transmitted control signal. Energization of coil 92 actuates closure of the relay 66 contact terminals 74 and 76 to thereby connect AC voltage terminal 72 to the common junction C of motor windings 58 and 60. As the contact terminals 82 and 86 of SPDT relay 70 are normally closed, the AC path for the motor windings 58 and 60 is completed therethrough to voltage terminal 73. Accordingly, a main AC current flows through winding 58, and a phase shifted AC current flows through winding 60, capacitor 88 and resistor 90. The resulting out-of-phase energization of windings 58 and 60 causes motor 54 to rotate counterclockwise. The phase shifted current in winding 60 is due to the fact that the current is flowing through a series LC phase shift network comprising capacitor 88 and winding 60.

In the event the received signal comprises a second predetermined frequency, only detector 100 will be activated. The resulting conduction periods of transistor 118 forward bias diodes 136 and 138 and cause energization current to flow through both relay coils 92 and 96. In response, contacts 74 and 76 of SPST relay 66 are closed, and SPDT relay 86 is actuated to open the connection between terminals 82 and 86 and close contact terminals 84 and 86. With this manner of connection to the AC power source, winding 58 and capacitor 88 form the series LC phase shifting network so that a main AC current flows through winding 60 and a phase shifted current flows through winding 58. This reversed mode of motor winding energization causes motor 54 to rotate in a clockwise direction.

Application of a third control signal frequency will activate a response solely from detector 102, which thereby energizes relay coil 94 to actuate closure of the SPST relay contacts 78 and 80. With the SPDT relay contacts 82 and 86 normally closed, a main AC current flows through winding 62, and the series arrangement of capacitor 88 and winding 64 provides a phase shifted AC current flow through winding 64. Under these conditions, motor 56 is caused to rotate counterclockwise. It is seen, therefore, that the operation of detector 102 is analogous to that of detector 98.

To cause a reverse direction of rotation of motor 56, i.e. clockwise, signal detector 104 operates similarly to detector 100. That is, upon receiving a fourth control signal frequency, only resonant circuit 132—134 is activated to cause periodic conduction of transistor 122 and thus forward biasing of diodes 140 and 142. As a consequence, relay coils 94 and 96 are energized to close SPST relay terminals 78 and 80 and SPDT relay terminals 84 and 86. The resulting main AC current flow through winding 64 and phase shifted AC current flow through winding 62 and capacitor 88 cause clockwise rotation of motor 56.

Figure 1:
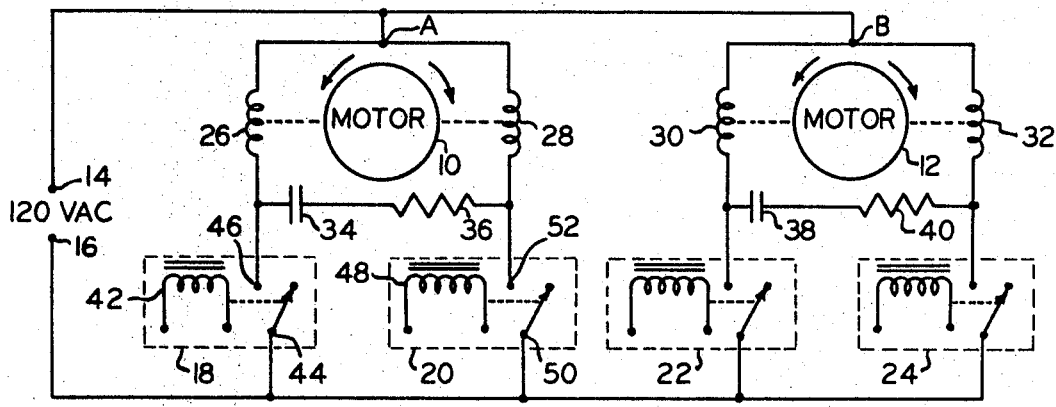
FIG. 1 is a schematic diagram of a prior art relay control system for bidirectional motors to which previous reference has been made.

From the foregoing description, therefore, it is clear that by virtue of the relay connections in accordance with the present invention, as illustrated by FIG. 2, all the functions of the prior art system of FIG. 1 are provided with the saving of one relay, one phase shifting capacitor and one antiarcing resistor. Of course, these component reduction advantages are multiplied as the number of motors to be controlled increases. That is, the illustration of two motors in FIG. 2 is merely representative. This relay control system may be extended to regulate any number of motors. For example, control of three motors would require the addition of a third SPST relay and a third pair of signal detectors. One of the added signal detectors would be connected to energize the third SPST relay, which would be coupled between the common junction of the third motor windings and the AC source, and the other added detector would be coupled through diodes to the third SPST relay coil and the coil of SPDT relay 70. The ends of the third motor windings opposite the common junction would be respectively connected to terminals 82 and 84 of relay 70 so as to make use of this common SPDT relay and the common phase shifting capacitor 88. In this event there is a saving of two relays and two capacitors over the prior art. In like manner, the control system could be extended to regulate a fourth motor and provide a savings of three relays, etc.

FIG. 3 shows an alternative embodiment of the relay control system according to the invention for controlling three bidirectional motors. In particular, the invention is illustrated as embodied in a typical remote control system for a color television receiver. Like reference numerals in FIGS. 2 and 3 identify analogous components in the two systems. Thus, motor 54 is controlled by relays 66 and 70 and signal detectors 98 and 100 in the same manner described with respect to the FIG. 2 system. The circuit variations of FIG. 3 reside in the external circuit connections of SPDT relay coil 96 and the coupling between the output of detector 100 and relay coil 96. Likewise, motor 56 is controlled by relays 68 and 70 and detectors 102 and 104 in the same manner as the FIG. 2 system, the circuit differences being in the coupling between detector 104 and relay coil 96. Further, the FIG. 3 system has been extended to control a third motor 150, having a pair of windings 152 and 154 with a common junction E. The ends of windings 152 and 154 opposite the common junction E are connected to SPDT relay terminals 82 and 84, respectively, and common junction E is connected to normally open terminal 156 of a third SPST relay 158. The common terminal 160 of relay 158 is connected to the AC line voltage terminal 72.

In order to selectively energize the relays controlling motor 150, the FIG. 3 system also includes fifth and sixth signal detectors 162 and 164, which are identical to signal detectors 98—104 except that the series resonant circuits of detectors 162 and 164 are respectively tuned to respond to fifth and sixth control signal frequencies different from the four control signal frequencies to which detectors 98—104 are tuned. Detectors 162 and 164 control motor 150 via relays 158 and 70 in the same manner that detectors 102 and 104 control motor 56 via relays 68 and 70, and detectors 98 and 100 control motor 54 via relays 66 and 70. Hence, the collector of the drive transistor 166 of detector 162 is connected directly to one end of coil 168 of relay 158 and via diode 170 to the collector of the detector 164 drive transistor 172. Diode 170 is oriented with its anode connected to the collector of transistor 166. The other end of relay coil 168 is connected to B+ terminal 144, and a capacitor 174 is connected across coil 168 to perform the same function as capacitors 146, 147 and 148.

The significant control circuit variations of FIG. 3 are as follows. Instead of being coupled through diodes to SPDT relay coil 96, the collectors of detector drive transistors 118, 122 and 172 are respectively coupled through resistors 176, 178 and 180 to the base electrode of a PNP transistor 182. The emitter of transistor 182 is connected to B+ terminal 144, and its collector electrode is connected to one end of SPDT relay coil 96, the other end of which is connected to ground. A capacitor 184 is connected across the emitter and base electrodes of transistor 182. Thus, as the emitter and collector of transistor 182 and the SPDT relay coil 96 are serially connected between the DC voltage source at terminal 144 and ground, base control of transistor 182 by the signal detectors is operative to control the energization of coil 96.

In the absence of a signal at the base of transistor 182, the PNP transistor is in the nonconducting state. Consequently, no current flows through SPDT relay coil 96, thereby leaving the common terminal 86 connected to the normally closed terminal 82 of relay 70. Now if the fifth control signal frequency is received, only detector 162 will be activated to cause periodic conduction of drive transistor 166. The resulting voltage drop at the collector of transistor 166 is blocked from affecting the base bias of transistor 182 by reverse biased diode 170. Hence, relay 70 remains unenergized. The conducting transistor 166, however, does cause energizing current to flow through coil 168 and thus close the SPST relay 158 terminals 156 and 160 to cause counterclockwise rotation of motor 150.

If the sixth control signal frequency is received, it will activate only detector 164, thereby causing drive transistor 172 to conduct on the positive half-cycles of the control signal. As a result, the voltage at the collector of transistor 172 drops to forward bias diode 170 and thus cause an energizing current flow through SPST relay coil 168. This closes the contact terminals 156 and 160 of relay 158 to connect the common junction E of motor windings 152 and 154 to AC voltage terminal 72. Simultaneously, the emitter-base of PNP transistor 182 is forward biased via resistor 180 to switch that transistor to the conducting state. Capacitor 184 holds this forward bias voltage at the base of transistor 182 during the negative half-cycles of transistor 172. The conducting transistor 182 causes energizing current to flow through relay coil 96 and thus close the contact terminals 84 and 86 of SPDT relay 70. With terminal 84 thereby connected to AC voltage terminal 73, motor 150 is caused to rotate in a clockwise direction.

Of course, detectors 98 and 102 function analogously to detector 162 with respect to their corresponding motors and relays, and detectors 100 and 104 operate in a similar manner to detector 164 with respect to their corresponding relays and motors.

In the FIG. 3 embodiment, each of the motors is mechanically coupled to a respective potentiometer for controlling a function of the color television receiver with which the system is associated. In particular, motor 54 effects bidirectional rotation of volume control 186; motor 56 effects bidirectional rotation of color control 188; and motor 150 effects bidirectional control of tint control 190. Activation of detector 98 controls motor 54 to turn the volume up, and activation of detector 100 turns the volume down. If detector 102 is activated, motor 56 will be actuated to increase color intensity, and if detector 104 is activated, the color intensity will be decreased. Control signal triggering of detector 162 actuates tint control 190 via motor 150 toward green, and triggering of detector 164 actuates control 190 toward a red tint.

In operation, a selector button on transmitter 192 is actuated to cause radiation of one of six different ultrasonic signal frequencies, each corresponding to a different one of the six functions of the remote control system; viz, volume up or down, color increase or decrease, and tint green or red. Typically, these control signal frequencies are selected from a range between the second and third harmonics of the horizontal oscillator. Frequencies lower than this range required an undesirably high transmitter power, while frequencies above this range cause transducer problems. To avoid signal ambiguity, the frequencies typically are spaced approximately 1.5 kHz. apart.

The selected ultrasonic control signal is propagated through the air and received by transducer 194, wherein the sound signal is converted to an electrical signal of the same frequency. The signal is then amplified by circuit 196 and applied to all six of the signal detectors. The detector tuned to respond to the particular control signal frequency received will then be activated to energize its associated relays and motor to produce the function corresponding to that signal frequency. The duration of motor rotation may be controlled by the length of time the transmitter selector button is depressed.

It is contemplated that the present invention may be embodied in a control system employing switching means other than relays, such as silicon control rectifiers or transistors.

Further, the switching may be actuated by control means other than those described, including manual operation. The invention is not restricted to remote control systems, and the system may be employed to control dual motor functions other than bidirectional rotation. Hence, although the invention has been described with respect to certain specific embodiments, it will be appreciated that modifications and changes may be made by those skilled in the art without departing from the true spirit and scope of the invention.

I claim:

1. A control system for a plurality of motors each having first and second windings comprising: a like plurality of first switching means respectively associated with said motors; a source of AC voltage having first and second terminals, the first and second windings of each of said motors having a common junction coupled through a respective one of said first switching means to the first terminal of said source of AC voltage; a second switching means having first, second and common terminals, the first terminal of said second switching means being connected to each of said first windings at the opposite end of the winding from said common junction, the second terminal of said second switching means being connected to each of said second windings at the opposite end of the winding from said common junction, and the common terminal of said second switching means being connected to the second terminal of said source of AC voltage; and control means connected to said first and second switching means for controlling said first switching means to selectively connect one of the common junctions of the first and second windings of said motors to the first terminal of said source of AC voltage and for controlling said second switching means to selectively connect the first terminal or the second terminal of said second switching means to the common terminal of said second switching means.

2. A control system in accordance with claim 1 wherein said motors are bidirectional, and further including a first capacitor connected between the first and second terminals of said second switching means whereby said first capacitor cooperates with one of the windings of each of said motors to form an LC phase shifting network for each of said motors.

3. A control system in accordance with claim 2 wherein each of said first switching means is normally open and the common terminal of said second switching means is normally closed with its first terminal, whereby closure of one of said first switching means is operative to effect one direction of rotation of the motor coupled thereto, and closure of one of said first switching means together with activation of said second switching means to open the common to first terminal connection and close the common terminal with said second terminal is operative to effect the opposite direction of rotation of the motor coupled to the closed one of said first switching means.

4. A control system in accordance with claim 3 wherein said control means comprises a plurality of sets of first and second signal detectors each set being associated with a respective one of said motors, and means coupling the outputs of said signal detectors to said first and second switching means whereby activation of one of said first signal detectors is operative to actuate the first switching means coupled to the motor associated with the activated one of said first signal detectors, and activation of one of said second signal detectors is operative to actuate both said second switching means and first switching means coupled to the motor associated with the activated one of said second signal detectors.

5. A control system in accordance with claim 4 wherein each of said first switching means comprises a SPST relay having SPST contacts and a coil, said SPST relay contacts including a normally open terminal connected to the common junction of the associated motor windings and a common terminal connected to the first terminal of said source of AC voltage, and said SPST relay coil being coupled to the outputs of one set of said first and second signal detectors, and wherein said second switching means comprises a SPDT relay having SPDT contacts and a coil, said SPDT relay contacts comprising said first, second and common terminals of said second switching means, and said SPDT relay coil being coupled to the outputs of all of said second signal detectors.

6. A control system in accordance with claim 5 wherein the output of each of said first signal detectors is connected directly to a respective one of said SPST relay coils, and the output of each of said second signal detectors is coupled through a first diode to a respective one of said SPST relay coils and through a second diode to said SPDT relay coil.

7. A control system in accordance with claim 6 further including a source of DC voltage connected to each of said SPST and SPDT relay coils at the end opposite that coupled to the outputs of said signal detectors, a plurality of second capacitors each connected across a respective one of said SPST and SPDT relay coils, and receiving means for receiving any one of a plurality of control signals of different predetermined frequencies, and wherein each of said signal detectors comprises a transistor having base, collector and emitter electrodes, a source of reference potential, a series resonant circuit connected between said receiving means and said source of reference potential and tuned to selectively respond to one of said control signal frequencies, means coupling said resonant circuit to the base of said transistor, and means coupling the emitter of said transistor to said source of reference potential, the collector of said transistor being the output of said signal detector.

8. A control system in accordance with claim 5 further including a source of DC voltage connected to each of said SPST relay coils at the end opposite that coupled to the outputs of said signal detectors, a source of reference potential, and a first transistor having base, emitter and collector electrodes, the emitter and collector of said first transistor and said SPDT relay coil being serially connected between said source of DC voltage and said source of reference potential, and wherein the output of each of said first signal detectors is connected directly to a respective one of said SPST relay coils, and the output of each of said second signal detectors is coupled through a diode to a respective one of said SPST relay coils and through a resistor to the base of said first transistor.

9. A control system in accordance with claim 8 further including a plurality of second capacitors each connected across a respective one of said SPST and SPDT relay coils, and receiving means for receiving any one of a plurality of control signals of different predetermined frequencies, and wherein each of said signal detectors comprises a second transistor having base, collector and emitter electrodes, a series resonant circuit connected between said receiving means and said source of reference potential and tuned to selectively respond to one of said control signal frequencies, means coupling said resonant circuit to the base of said second transistor, and means coupling the emitter of said second transistor to said source of reference potential, the collector of said second transistor being the output of said signal detector.

10. A remote control system for a television receiver including a plurality of bidirectional motors each connected to control a respective function of the television receiver and each having first and second windings comprising: a plurality of first switching means each associated with a respective one of said motors; a source of AC voltage having first and second terminals, said first and second windings of each of said motors having a common junction coupled to a respective one of said first switching means and each of said first switching means being connected to the first terminal of said source of AC voltage; a second switching means having a first terminal connected to each of said first windings, a second terminal connected to each of said second windings, and a common terminal connected to the second terminal of said source of AC voltage; transmitting and receiving means for providing a plurality of signal frequencies; a plurality of signal detectors connected to said receiving means, each of said signal detectors for providing an output signal in response to a respective one of the signal frequencies; and means connecting said signal detectors to said first and second switching means whereby the output signals of said signal detectors control said first and second switching means to selectively connect said first and second windings of said motors to said source of AC voltage.

11. A remote control system in accordance with claim 10 wherein said plurality of signal detectors comprises a plurality of sets of first and second signal detectors, each set being associated with a respective one of said motors, and wherein each of said first signal detectors is connected to a respective one of said first switching means for operating the one of said first switching means connected thereto to effect rotation in one direction of the one of said motors associated therewith when the associated one of said first detectors provides an output signal, and wherein each of said second signal detectors is connected to said second switching means for operating said second switching means in response to an output signal from one of said second signal detectors and each of said second signal detectors is further connected to a respective one of said first switching means for operating the one of said first switching means connected thereto to effect rotation in the opposite direction of the one of said motors associated therewith when the associated one of said second detectors provides an output signal.

12. A remote control system in accordance with claim 10 including a capacitor connected between the first and second terminals of said second switching means whereby said capacitor cooperates with one of the windings of each of said motors to form an LC phase shifting network for each of said motors.